(12) United States Patent
Wu

(10) Patent No.: US 8,092,015 B2
(45) Date of Patent: Jan. 10, 2012

(54) HONEYCOMB COATING MELANIN LENS AND MANUFACTURING PROCESS THEREOF

(76) Inventor: Chihming Wu, Dongguan (CN)

( * ) Notice: Subject to any disclaimer, the term of this patent is extended or adjusted under 35 U.S.C. 154(b) by 0 days.

(21) Appl. No.: 12/760,824

(22) Filed: Apr. 15, 2010

(65) Prior Publication Data

US 2011/0007265 A1    Jan. 13, 2011

(30) Foreign Application Priority Data

Jul. 12, 2009    (CN) .......................... 2009 1 0213648

(51) Int. Cl.
*G02C 7/10*    (2006.01)
(52) U.S. Cl. ....................................... 351/163; 351/177
(58) Field of Classification Search .......... 351/163–165, 351/177
See application file for complete search history.

(56) References Cited

U.S. PATENT DOCUMENTS

| | | | | |
|---|---|---|---|---|
| 4,698,374 | A * | 10/1987 | Gallas ........................... | 523/106 |
| 6,761,452 | B2 * | 7/2004 | Moravec et al. ............. | 351/177 |
| 2004/0145701 | A1 * | 7/2004 | Miniutti et al. ............... | 351/159 |
| 2008/0186448 | A1 * | 8/2008 | Ishak et al. .................... | 351/163 |

* cited by examiner

*Primary Examiner* — Scott J Sugarman
(74) *Attorney, Agent, or Firm* — Jackson IPG PLLC; Demian K. Jackson

(57) ABSTRACT

The present invention provides a honeycomb coating melanin lens and a manufacturing process thereof, wherein, it is an optical lens that has honeycomb pattern printed on a surface of a melanin lens and the two sides of the lens are respectively coated with a blue coating and a gold coating. The honeycomb pattern can also adopt other geometric configurations that are arrayed uniformly, and the pattern is printed with a covering paint (water-soluble resin). The present invention adopts the method of first printing honeycomb pattern on the surface of the melanin lens and then coating by vacuum plating to obtain the honeycomb coating melanin lens; the manufacturing process has good stability, low cost and good quality. Not only the lens can isolate the computer radiate and highlight screen flash in a close distance, but also the honeycomb pattern can effectively shield and reflect the highlight and stray scatteredlight; the lens only accepts parallel rays to be through, so, the direct hurt caused by scatteredlight to the eye retina and the eye crystalline lens is reduced, and the eye ciliary muscle is relaxed; the lens can promote blood circulation, and can protect people from computer radiate, so as to protect the eye and improve night-vision ability; furthermore, the lens can solve the problems of dry eye syndrome, acid swells and visual fatigue coming from using a computer for a long time.

4 Claims, 1 Drawing Sheet

HONEYCOMB COATING MELANIN LENS AND MANUFACTURING PROCESS THEREOF

FIELD OF THE INVENTION

The present invention relates to the technical field of optical materials, which involves a manufacturing method of a coating lens, and particularly involves a honeycomb coating melanin lens and a manufacturing process thereof.

BACKGROUND OF THE INVENTION

With the development of the times and the science, the computer has become an indispensable important item in the work, study, life, and even the entertainment of people; particularly to those people who work in an office, they face the computer screen at a close distance for all day long, so, a great deal of computer radiate, highlight screen flash, and screen scatteredlight will directly hurt the eye retina and the eye crystalline lens, and the computer radiate will also cause the pigmentation on the face, and the phenomena of dry eye syndrome, acid swells, visual fatigue, and black eye. Furthermore, the El Nino phenomenon today cause the holes in the atmospheric layer, so, the harmful rays directly irradiate more, and the hurt to the eye ball will increase every day. People think out many methods to solve the above mentioned problems, which include wearing polarization glasses and radiation protection glasses to prevent computer radiate, highlight screen flash, and screen scatteredlight, and wearing anti UV sunglasses to prevent ultraviolet rays, but the effect will not satisfy people.

SUMMARY OF THE INVENTION

An object of the present invention is to provide a honeycomb coating melanin lens and a manufacturing process thereof, which comprises first adopting melanin powder, PC (or AC, or CR39) material, and a colour-changing agent in a certain proportion to manufacture a melanin lens, then printing honeycomb pattern on the surface of the melanin lens, and then carrying out optical vacuum plating, thereby obtaining the honeycomb coating melanin lens. The honeycomb coating melanin lens of the present invention can isolate the computer radiate and highlight screen flash in a close distance, and can effectively shield and reflect the highlight and stray scatteredlight; the direct hurt caused by scatteredlight to the eye retina and the eye crystalline lens is greatly reduced, so as to protect the eye and improve night-vision ability; furthermore, the melanin lens can also protect the eye ball of people from computer radiate, and it can solve the problems of dry eye syndrome, acid swells and visual fatigue coming from using a computer for a long time.

The present invention provides a honeycomb coating melanin lens; wherein, it is an optical lens that has honeycomb pattern printed on a surface of a melanin lens and the two sides of the lens are respectively coated with a blue coating and a gold coating; the melanin lens is made from PC (or AC, or CR39) material, melanin powder and a colour-changing agent, which are mixed uniformly in a certain proportion and then made into a melanin lens via a conventional lens fabrication process;

The composition proportion of the melanin lens is: the proportion of melanin powder to PC (or AC, or CR39) material is 1:300-1:30000, and the proportion of the colour-changing agent to PC (or AC, or CR39) material is 20 g/kg.

The honeycomb pattern printed on the surface of the melanin lens is printed with a covering paint (water-soluble resin); the two sides of the melanin lens are respectively coated with a blue coating and a gold coating by vacuum plating.

The honeycomb coating melanin lens of the present invention, also characterized in that:

the honeycomb pattern can also adopt other geometric configurations that are arrayed uniformly.

The two sides of the melanin lens are respectively coated with a blue coating and a gold coating; or the two sides of the melanin lens are coated with only one kind of the two coatings according to the requirement, and the coating color is blue, or gold, or other color.

The present invention also provides a manufacturing process of the honeycomb coating melanin lens, characterized in that the manufacturing process comprises melanin lens manufacturing, antifogging process, pattern printing, coating, and washing, and the concrete steps are as follows:

step 1. melanin lens manufacturing: take melanin powder, PC (or AC, or CR39) material, and a colour-changing agent to be mixed; the proportion of melanin powder to PC (or AC, or CR39) material is 1:300-1:30000, and the proportion of the colour-changing agent to PC (or AC, or CR39) material is 20 g/kg; then manufacture a melanin lens via a conventional lens fabrication process;

step 2. antifogging process: soak the melanin lens in an antifogging agent, and then dry the melanin lens by airing;

step 3. printing the honeycomb pattern via a pad printer:

put the melanin lens into a mould on the pad printer loaded with a computer carving honeycomb pattern template, adjust the air pressure of the plastic head of the pad printer to 4 $kg/cm^2$, and then print the honeycomb pattern at the speed of pushing down for 3-7 seconds and pulling up for 8-12 seconds with a covering paint (water-soluble resin);

step 4. coating in an optical vacuum coater:

A. coating a blue coating: arrange lenses by their backs, clean the dust with a static gun, put the lenses in an optical vacuum coater to vacuumize for 20-35 minutes, and then start to coat at the vacuum pressure of $1.0 \times 10^{-5}$; coat argon as the first layer for 3-8 minutes by spray plating with an ion gun, coat a high refractive index material as the second layer for 5-10 minutes by spray plating, and coat a low refractive index material as the third layer for 5-10 minutes by spray plating, thereby obtaining the blue coating;

B. coating a gold coating: arrange lenses by their fronts, clean the dust with a static gun, vacuumize for 20-35 minutes, and then start to coat at the vacuum pressure of $1.0 \times 10^{-5}$; coat argon as the first layer for 3-8 minutes by spray plating with an ion gun, coat a high refractive index material as the second layer for 5-10 minutes by spray plating, coat a low refractive index material as the third layer for 3-8 minutes by spray plating, and coat a waterproof material as the fourth layer for 2-6 minutes by spray plating, thereby obtaining the gold coating;

step 5. arrange lenses by their backs, clean the dust with a static gun, vacuumize for 12-18 minutes, and then coat a waterproof material for 2-6 minutes by spray plating at the vacuum pressure of $2.0 \times 10^{-5}$;

step 6. washing in an ultrasonic cleaner: wash by ultrasonic cleaning for 3-5 minutes with filtered clean cold water, then wash for 30-50 seconds in hot water of 75-80° C., so as to clean the covering paint (water-soluble resin);

step 7. get out and dry the lenses, thereby obtaining the finished lenses.

The high refractive index material is zirconium dioxide ($ZrO_2$); the low refractive index material is sulfur dioxide ($SiO_2$); the waterproof material is a water remover.

In the honeycomb coating melanin lens of the present invention, as manufacturing the substrate, first add appropriate proportion of melanin and colour-changing agent to the lens base material like PC (or AC, CR39, HI-index, Polycarbonate, Acrylic etc.) material, then mix them to manufacture a melanin lens; then print the surface of the manufactured melanin lens with honeycomb pattern, and coat respectively with a blue coating and a gold coating on the two sides of the lens, wherein, the pattern is printed with a covering paint (water-soluble resin) that is water-soluble and quick-drying; finally, wash the lens in an ultrasonic cleaner and then dry it, thereby obtaining the finished lens. The manufacturing process has good stability, low cost and good quality. Not only the lens of the present invention can isolate the computer radiate and highlight screen flash in a close distance, but also the honeycomb pattern can effectively shield and reflect the highlight and stray scatteredlight; the lens can correct the rays to parallel rays to be into human vision, so, the direct hurt caused by scatteredlight to the eye retina and the eye crystalline lens is reduced, and the eye ciliary muscle is relaxed; the lens can promote blood circulation, so as to protect the eye and improve night-vision ability; furthermore, the lens can protect people from computer radiate, and it can solve the problems of dry eye syndrome, acid swells and visual fatigue coming from using a computer for a long time.

The honeycomb coating melanin lens of the present invention has the visual function of protecting the eye, and can prevent the rays (especially the blue rays) from reflecting repeatedly, so it has the effects of reducing dazzle, increasing contrast ratio, and increasing visual image. The melanin lens can reinforce or even replace the natural endocrine of human body melanin. The lens provided with melanin can isolate ultraviolet rays for 100 percent, and can isolate blue rays (wavelength 450-480 nm) for over 98 percent; the honeycomb coating melanin lens does not simply isolate high-energy rays, but do absorb rays at the frequency of a certain proportion, which can reduce harmful HEV rays without losing the original color.

DESCRIPTION OF THE PREFERRED EMBODIMENT

The present invention is best understood from the following detailed description with reference to the accompanying figures and preferred embodiments.

Figure 1:
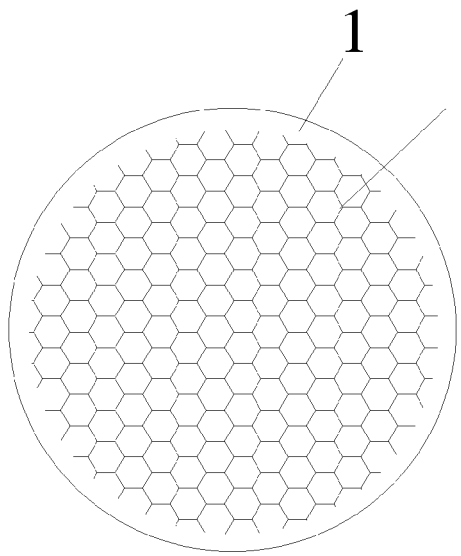
FIG. 1 is a structure schematic diagram of the honeycomb coating melanin lens of the present invention.
Figure 2:
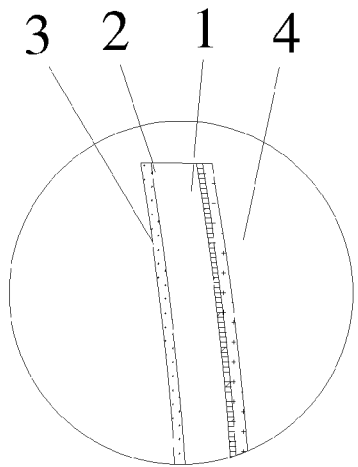
FIG. 2 is a partial enlarged schematic diagram of the honeycomb coating melanin lens of the present invention.

A honeycomb coating melanin lens, as shown in FIG. 1 and FIG. 2, is an optical lens that has honeycomb pattern printed on a surface of a melanin lens and the two sides of the lens are respectively coated with a blue coating and a gold coating; the melanin lens is made from PC (or AC, or CR39) material, melanin powder and a colour-changing agent that are mixed uniformly and made into a melanin lens via a conventional lens fabrication process.

The composition proportion of the melanin lens is: the proportion of melanin powder to PC (or AC, or CR39) material is 1:300-1:30000, and the proportion of the colour-changing agent to PC (or AC, or CR39) material is 20 g/kg.

Figure 3:
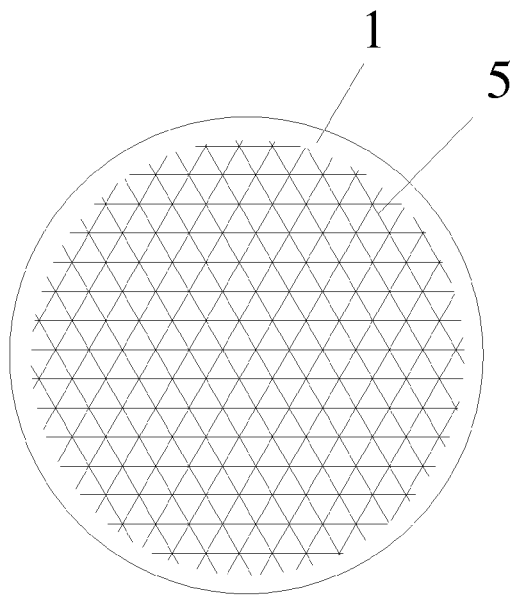
FIG. 3 is a structure schematic diagram of a coating melanin lens with another pattern of the present invention.

The honeycomb pattern printed on the surface of the melanin lens is printed with a covering paint (water-soluble resin), and to get different graphic effects, the honeycomb pattern can also adopt other geometric configurations that are arrayed uniformly, such as triangle shown in FIG. 3, or circle, polygon, etc.; the two sides of the melanin lens are respectively coated with a blue coating and a gold coating by vacuum plating, or are coated with only one kind of the two coatings according to the requirement, and the coating color is blue, or gold, or other color.

The manufacturing process of the honeycomb coating melanin lens provided by the present invention comprises the following steps.

The steps are melanin lens manufacturing, antifogging process, pattern printing, coating, and washing; the concrete steps are as follows:

step 1. melanin lens manufacturing: take melanin powder, PC (or AC, or CR39) material, and a colour-changing agent to be mixed; the proportion of melanin powder to PC (or AC, or CR39) material is 1:300-1:30000, and the proportion of the colour-changing agent to PC (or AC, or CR39) material is 20 g/kg; then manufacture a melanin lens via a conventional lens fabrication process;

step 2. antifogging process: soak the melanin lens in an antifogging agent, and then dry the melanin lens by airing;

step 3. printing the honeycomb pattern via a pad printer put the melanin lens into a mould on the pad printer loaded with a computer carving honeycomb pattern template, adjust the air pressure of the plastic head of the pad printer to 4 $kg/cm^2$, print the honeycomb pattern at the speed of pushing down for 3-7 seconds and pulling up for 8-12 seconds with a covering paint (water-soluble resin);

step 4. coating in an optical vacuum coater:

A. coating a blue coating: arrange lenses by their backs, clean the dust with a static gun, put the lenses in a vacuum coater to vacuumize for 20-35 minutes, then start to coat at the vacuum pressure of $1.0\times10^{-5}$; coat argon as the first layer for 3-8 minutes by spray plating with an ion gun, so, the ion gun destroys the surface of the lens in the optical vacuum coater to produce innumerable very tiny pores on the surface to be good for the coating paint to adhere, then coat a high refractive index material as the second layer for 5-10 minutes by spray plating, and then coat a low refractive index material as the third layer for 5-10 minutes by spray plating, thereby obtaining the blue coating;

B. coating a gold coating: arrange lenses by their fronts, clean the dust with a static gun, put the lenses in a vacuum coater to vacuumize for 20-35 minutes, then start to coat at the vacuum pressure of $1.0\times10^{-5}$; as the same, coat argon as the first layer for 3-8 minutes by spray plating with an ion gun, so, the ion gun destroys the surface of the lens in the optical vacuum coater to produce innumerable very tiny pores on the surface to be good for the coating paint to adhere, then coat a high refractive index material as the second layer for 5-10 minutes by spray plating, then coat a low refractive index material as the third layer for 3-8 minutes by spray plating, and then coat a waterproof material as the fourth layer for 2-6 minutes by spray plating, thereby obtaining the gold coating;

step 5. arrange lenses by their backs, clean the dust with a static gun, vacuumize for 12-18 minutes, and then coat a waterproof material for 2-6 minutes by spray plating at the vacuum pressure of $2.0\times10^{-5}$;

step 6. washing in an ultrasonic cleaner: wash by ultrasonic cleaning for 3-5 minutes with filtered clean cold water, then wash for 30-50 seconds with hot water of 75-80° C., so as to clean the covering paint (water-soluble resin);

step 7. get out and dry the lenses, thereby obtaining the finished lenses.

The high refractive index material is zirconium dioxide ($ZrO_2$); the low refractive index material is sulfur dioxide ($SiO_2$); the waterproof material is a water remover.

In the present invention, the melanin lens 1 is an optical lens that has honeycomb pattern 2 printed on its surface, and the two sides of the lens are respectively coated with a blue coating 3 and a gold coating 4; the honeycomb pattern 2 is printed with a covering paint (water-soluble resin) that has good water-solubility and quick-drying property; not only the lens can isolate the computer radiate and highlight screen flash in a close distance, but also the honeycomb pattern 2 or triangle pattern 5 on the surface of the lens can effectively shield and reflect the highlight and stray scatteredlight; the lens only accepts parallel rays to be through, so, the direct hurt caused by scatteredlight to the eye retina and the eye crystalline lens is reduced, and the eye ciliary muscle is relaxed; the lens can promote blood circulation, so as to protect the eye and improve night-vision ability; furthermore, the lens can protect people from computer radiate, and it can solve the problems of dry eye syndrome, acid swells and visual fatigue coming from using a computer for a long time.

The present invention also provides a manufacturing process of the honeycomb coating melanin lens, which adopts the method of first printing honeycomb pattern on the surface of the melanin lens and then coating to obtain the honeycomb coating melanin lens; the manufacturing process has good stability, low cost and good quality.

Although the present invention has been described in detail with above said preferred embodiments, but it is not to limit the scope of the invention. So, all the modifications and changes according to the characteristic and spirit of the present invention, are involved in the protected scope of the invention.

What is claimed is:

1. A honeycomb coating melanin lens, characterized in that it is an optical lens that has a honeycomb pattern printed on a surface of a melanin lens and the two sides of the lens are respectively coated with a blue coating and a gold coating; the melanin lens is made from PC or AC or CR39 material, melanin powder and a colour-changing agent, which are mixed uniformly and then made into a melanin lens via a lens fabrication process;

the composition proportion of the melanin lens is: the proportion of melanin powder to PC or AC or CR39 material is 1:300-1:30000, and the proportion of the colour-changing agent to PC or AC or CR39 material is 20 g/kg;

the honeycomb pattern printed on the surface of the melanin lens is printed with a covering paint; the two sides of the melanin lens are respectively coated with a blue coating and a gold coating by vacuum plating.

2. The honeycomb coating melanin lens of claim 1, wherein two sides of the melanin lens are respectively coated with a blue coating and a gold coating; or the two sides of the melanin lens are coated with only one kind of the two coatings, and the coating color is blue, or gold, or other color.

3. A manufacturing process of a honeycomb coating melanin lens, characterized in that the manufacturing process comprises melanin lens manufacturing, antifogging process, pattern printing, coating, and washing, and the concrete steps are as follows:

step 1. a melanin lens manufacturing step includes taking melanin powder, PC or AC or CR39 material, and a colour-changing agent to be mixed; the proportion of melanin powder to PC or AC or CR39 material is 1:300-1:30000, and the proportion of the colour-changing agent to PC or AC or CR39 material is 20 g/kg; then manufacture a melanin lens via a lens fabrication process;

step 2. an antifogging process including soaking the melanin lens in an antifogging agent, and then dry the melanin lens by airing;

step 3. printing the honeycomb pattern via a pad, including putting the melanin lens into a mould on the pad printer loaded with a computer carving honeycomb pattern template, adjust the air pressure of the plastic head of the pad printer to 4 $kg/cm^2$, and then print the honeycomb pattern at the speed of pushing down for 3-7 seconds and pulling up for 8-12 seconds with a covering paint;

step 4. coating in an optical vacuum coater, including:
A. coating a blue coating: arrange lenses by their backs, clean the dust with a static gun, put the lenses in a vacuum coater to vacuumize for 20-35 minutes, and then start to coat at the vacuum pressure of $1.0\times10^{-5}$; coat argon as the first layer for 3-8 minutes by spray plating with an ion gun, coat a high refractive index material as the second layer for 5-10 minutes by spray plating, and coat a low refractive index material as the third layer for 5-10 minutes by spray plating, thereby obtaining the blue coating;
B. coating a gold coating: arrange lenses by their fronts, clean the dust with a static gun, vacuumize for 20-35 minutes, and then start to coat at the vacuum pressure of $1.0\times10^{-5}$; coat argon as the first layer for 3-8 minutes by spray plating with an ion gun, coat a high refractive index material as the second layer for 5-10 minutes by spray plating, coat a low refractive index material as the third layer for 3-8 minutes by spray plating, and coat a waterproof material as the fourth layer for 2-6 minutes by spray plating, thereby obtaining the gold coating;

step 5. arrange lenses by their backs, clean the dust with a static gun, vacuumize for 12-18 minutes, and then coat a waterproof material for 2-6 minutes by spray plating at the vacuum pressure of $2.0\times10^{-5}$;

step 6. washing in an ultrasonic cleaner, including washing by ultrasonic cleaning for 3-5 minutes with filtered clean cold water, then wash for 30-50 seconds in hot water of 75-80° C., so as to clean the covering paint; and step 7. remove and dry the lenses, thereby obtaining the finished lenses.

4. The manufacturing process of the honeycomb coating melanin lens of claim 3, wherein the high refractive index material is zirconium dioxide ($ZrO_2$); the low refractive index material is sulfur dioxide ($SiO_2$); the waterproof material is a water remover.

* * * * *